E. C. HORST.
METHOD OF PEELING FOOD PRODUCTS.
APPLICATION FILED MAY 14, 1918.
1,325,847.
Patented Dec. 23, 1919.
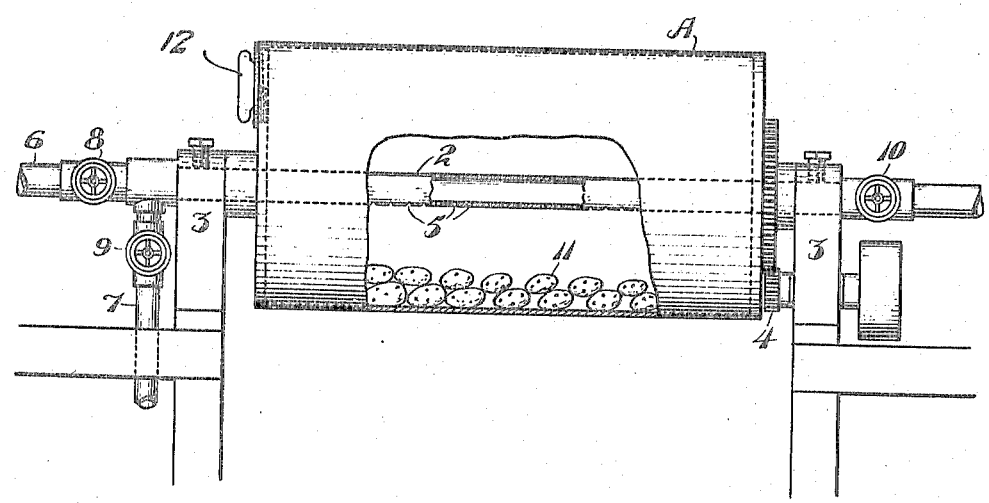
Inventor
Emil C. Horst
By
Strong & Townsend
Attorneys

UNITED STATES PATENT OFFICE.

EMIL CLEMENS HORST, OF SAN FRANCISCO, CALIFORNIA.

METHOD OF PEELING FOOD PRODUCTS.

1,325,847.  Specification of Letters Patent.  Patented Dec. 23, 1919.

Application filed May 14, 1918. Serial No. 234,395.

*To all whom it may concern:*

Be it known that I, EMIL CLEMENS HORST, a citizen of the United States, residing at the city and county of San Francisco, and State of California, have invented a new and useful Improvement in Methods of Peeling Food Products, of which the following is a specification.

This invention relates to a method of peeling food products, such as fruits, vegetables and the like.

The object of the present invention is to provide a cheap, simple and economical method of peeling food products, such as fruits, vegetables and the like, which consists in first subjecting the product to be peeled to scalding action of steam, and, secondly, in removing the peeling by abrasive action or by a water spray, or by abrasive and spray action simultaneously.

The apparatus employed in carrying out this method is shown in the accompanying drawing in which the figure is a side elevation, partly broken away.

Referring to the drawing, A indicates a drum, which, in this instance, is adapted to revolve about a stationary tube 2. This tube is supported in bearing brackets 3 disposed at each end of the drum, and power to rotate the drum is transmitted through the gears, generally indicated at 4. The portion of the pipe that extends through the drum is perforated, as at 5, and two connections are made at one end of the pipe, one with a source of steam supply, as at 6, and the other with a source of water supply under pressure, as at 7, both pipes being provided with valves 8 and 9 respectively to permit regulation of the steam or water admitted. The opposite end of the tube is also provided with a valve 10 to permit escape of steam as will hereinafter be described.

The product to be peeled, for instance, potatoes, is placed within the drum, as shown at 11, through a man hole or other suitable aperture 12, which is adapted to be closed after insertion of the product. Steam is then admitted by opening the valve 8 and the product is subjected to the scalding action of the steam a sufficient length of time to permit loosening of the jacket or peeling, the time period usually employed being from two to three minutes. The valve 8 is then closed and the valve 10 opened to permit the steam to escape. Valve 9 is next opened to permit water under pressure to enter the tube 2, and, as this tube is perforated, as at 5, it can readily be seen that the water will discharge in the form of a spray and thus remove the peeling or jacket, the removal of said jacket being considerably assisted, and, in some instances, entirely relied upon, by revolving the drum, the abrasive action of the potatoes rolling over and over each other being sufficient to remove the jackets. The potatoes, or other product to be peeled, after the operation is completed may be removed in any suitable manner and a new batch inserted.

The water spray may be relied upon in certain instances to remove the jackets, or abrasive action alone. In other instances, combined action of both the spray and abrasion is preferred, as it is found that certain food products are harder to treat than others.

While I have here described the method as applied to potatoes, I wish it understood that it may be employed in connection with a great variety of fruits and vegetables and other products.

Having thus described my invention, what I claim and desire to secure by Letters Patent is:

The herein described method of peeling food products, which consists in first confining the mass in a closed container, then in admitting steam into the container to scald the mass, then in permitting the steam to escape, and finally in subjecting the mass to radial streams of water under pressure and during rotation of the container, the water being impacted against the mass only from below the axis of rotation of the container.

In testimony whereof I have hereunto set my hand in the presence of two subscribing witnesses.

EMIL CLEMENS HORST.

Witnesses:
JOHN H. HERRING,
W. W. HEALEY.